(12) United States Patent
Nakamura

(10) Patent No.: US 8,267,784 B2
(45) Date of Patent: Sep. 18, 2012

(54) GAME SYSTEM AND COMPUTER READABLE MEDIUM INCLUDING A MARKER POSITION DETERMINATION PORTION

(75) Inventor: Masaru Nakamura, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 160 days.

(21) Appl. No.: 12/893,544

(22) Filed: Sep. 29, 2010

(65) Prior Publication Data

US 2011/0077081 A1    Mar. 31, 2011

(30) Foreign Application Priority Data

Sep. 30, 2009  (JP) ................................. 2009-227106

(51) Int. Cl.
*A63F 9/24*  (2006.01)
*A63F 13/00*  (2006.01)
*G06F 17/00*  (2006.01)
*G06F 19/00*  (2006.01)

(52) U.S. Cl. .......................................... 463/35; 463/37

(58) Field of Classification Search ................ 463/35, 463/37

See application file for complete search history.

(56) References Cited

U.S. PATENT DOCUMENTS 7,128,649 B2 * 10/2006 Nobe et al. ...................... 463/23

FOREIGN PATENT DOCUMENTS

JP    11-151380    6/1999

* cited by examiner

*Primary Examiner* — William M. Brewster
(74) *Attorney, Agent, or Firm* — Edwards Wildman Palmer LLP; Peter C. Schechter; Brian R. Landry

(57) ABSTRACT

There is provided a game system in which areas where operation instruction markers of each player influence each other. The game system 1 determines a division position DP of lane L where an operation instruction marker IM is displayed each time when a predetermined condition is satisfied during a game, and a size of display area DA of the lane of each player based on the determined division position DP. The game system 1 also determines the position of operation instruction marker IM corresponding to each operation timing 20 described in sequence data SD so that the position changes with the progress of music being reproduced, and displays a game image GI where the operation instruction markers IM corresponding to each players P are arranged in the display area DA corresponding to the player P.

17 Claims, 12 Drawing Sheets

GAME SYSTEM AND COMPUTER READABLE MEDIUM INCLUDING A MARKER POSITION DETERMINATION PORTION

CROSS-REFERENCE TO RELATED APPLICATION

This application claims priority to Japanese Patent Application No. 2009-227106, filed Sep. 30, 2009. The entire content of the aforementioned patent application is incorporated herein by this reference.

BACKGROUND OF THE INVENTION

1. Field of the Invention

The present invention relates to a game system for allowing a player to operate predetermined operations in accordance with music being reproduced, and a computer readable medium.

2. Description of Background

In music game systems in which a player is allowed to operate predetermined operations in accordance with music being reproduced, a game system in which an operation instruction marker for directing a player an operation timing when the player should operate an operation portion is displayed in a game image is well known. In this music game system, the operation instruction marker is displayed in such a way that the operation instruction marker comes close to an operation criterion position gradually in accordance with a progress of the music so that the moment when the operation instruction marker reaches the operation criterion position corresponding to the current time on the music is taught as the operation timing to operate the operation portion. With respect to the area where such operation instruction markers are displayed, there exists a music game system having a mode in which the area gets smaller (for example, cf. JP-A=H11-151380).

SUMMARY OF THE INVENTION

However, there is no game system in which, in a case where a battle game is executed by a plurality of players, the areas, in each of which the operation instruction marker of each player is displayed, influence each other.

Then, it is an object of the present invention, to provide a game system in which, with respect to the areas each where the operation instruction marker to direct a player the operation timing is displayed, the areas, in each of which the operation instruction marker of each player is displayed, influence each other, and a computer readable medium.

The present invention addresses the above problem as follows.

A first aspect of the present invention provides a game system comprising: an operation input portion having an operation portion for each of players; a sound output portion outputting reproduced sound; a music data storage portion storing music data for reproducing music; a music reproduction portion reproducing music based on the music data to be output from the sound output portion; a sequence data storage portion storing sequence data where operation timings to operate the operation portion while the music is reproduced are described; a display portion displaying a game image where a lane having a predetermined length is divided at a division position, the lane extending between operation criterion positions each of which corresponds to each player; a correlation portion correlating one area of the lane divided at the division position to one player, and the other area of the lane divided to the other player; a division position determination portion determining the division position each time when a predetermined condition is satisfied during the game; and a display control portion displaying the game image where, in the area corresponding to each player, the operation instruction marker to direct a corresponding player each of the operation timings is arranged, wherein the display control portion has an area determination portion determining, based on the division position determined by the division position determination portion, a size of the area of the lane corresponding to each player; and a marker position determination portion determining a position of the operation instruction marker corresponding to each of the operation timings by regarding the operation criterion position as a current time, in such a way that a relative positional relation between the operation instruction marker and the operation criterion position changes in accordance with a temporal progress of the music so that the position of the operation instruction marker corresponding to the operation timing described in the sequence data reaches the operation criterion position of the corresponding player at the operation timing taught by the operation instruction marker.

According to the game system of the present invention, by the division position determination portion, the lane having a predetermined length is divided into two parts at the division position. Thereby, two areas across the division position are formed. Each area is correlated to each player by the correlation portion. In the area corresponding to each player P, the operation instruction marker is displayed by the display control portion, the operation instruction marker directing the player the operation timing to the operation portion. As the operation instruction marker is displayed in such a way that the operation instruction marker reaches the operation criterion position at its operation timing, there is provided the game where the moment when the position of operation instruction marker coincides with the operation criterion position is made each player recognized as the operation timing to operate the operation portion. Especially, in the present invention, each time when a predetermined condition is satisfied during the game, the division position is determined. Accordingly, the division position moves within the lane during the game. The size of each are changes depending on the movement of the division position. Namely, when one side of area gets bigger by the movement of the division position, the other side of area gets smaller. Thereby, it is possible to realize a state where the areas where the operation instruction markers of players are displayed influence each other.

In the present invention, the position of the operation instruction marker to be determined by the marker position determination portion is determined, not related to the size of the area, as the position based on the operation timing. Thereby, regardless of the size of areas, it is possible to make each operation instruction marker close to the operation criterion position at a predetermined speed. "a predetermined condition" to determine the division position may be a condition based on a game state, or may be a condition not related to the game state. As the condition not related to the game state, for example, it could be applied that the division position is set at a predetermined position at an predetermined elapsed-time.

One of the concrete constructions of the display control portion which arranges the operation instruction markers of each player in the area corresponding to each player is as follows. The display control portion may further comprise an operation timing obtaining portion obtaining from the sequence data, the operation timings which are included from the current time on the music up to a maximum time-length in which the operation instruction marker can be displayed. And the marker position determination portion may determine the position of the operation instruction markers corresponding to the operation timings obtained by the operation timing obtaining portion, and select, within the operation instruction markers the positions of which have been determined, the operation instruction markers existing in the area of the player corresponding to the operation instruction markers to arrange the operation instruction markers in the area.

According to this aspect, the operation instruction marker to be displayed in the game image is determined based on the positions of the operation instruction markers determined by the marker position determination portion. Therefore, it is enough for the operation timing obtaining portion to obtain always the operation timings included in the maximum time-length.

Alternatively, the display control portion may further comprise an operation timing obtaining portion, for each player, specifying time-length corresponding to the area and obtaining from the sequence data, the operation timings included from a current time on the music up to the time-length specified. And the marker position determination portion may determine a position of the operation instruction marker corresponding to each of the operation timings obtained by the operation timing obtaining portion, and arrange on the lane, the operation instruction markers the positions of which have been determined.

According to this aspect, by the operation timing obtaining portion only the operation timings of the operation instruction markers IM to be displayed are obtained. Therefore, it is enough that the display control portion display all of the operation instruction markers the positions of which are determined by the marker position determination portion in the corresponding area. When the time-length corresponding to a predetermined length of the lane (for example, the entire length of lane) is determined in advance, it is possible to determine the time-length corresponding to the area in accordance with a rate of the length of the area to the predetermined length. When the length of the area changes in a stepwise fashion, it is possible to determine the time-length corresponding to the area by preparing a table where each of the length of the area is correlated to its time-length.

The display control portion may display also a division position marker teaching the division position, while displaying the operation instruction markers of each player. Thereby, each player can recognize a state, caused by the movement of the division position, that the area where the operation instruction markers corresponding to himself/herself are displayed changes during the game. It is possible to enhance enjoyability of the game.

Both end sides of the lane may be provided, in the game image, so that each of the end sides extends toward the operation criterion position corresponding to each player, and the operation portion corresponding to each player may be provided on an line extended in a direction where the end side extends toward the operation criterion position of the corresponding player. Thereby, the operation criterion position exists near the operation portion, the operation criterion position being a position for making the player operate the operation portion. Accordingly, the operation instruction marker comes close to the player gradually to reach the operation criterion position. Therefore, it is possible to provide a state for the player to operate the operation portion easily.

an operation criterion marker may be located at the operation criterion position corresponding to each player in the game image, the operation criterion marker having the same shape as the operation instruction marker, and the marker position determination portion may determine a position of the operation instruction marker so that the operation instruction marker coincides with the operation criterion marker located at the operation criterion position of the corresponding player at the operation timing taught by the operation instruction marker. Thereby, it is possible to make a player recognize it more clearly that the operation instruction marker reaches the operation criterion position.

The game system may further comprise an operation evaluation portion evaluating an operation by the player based on a moment when the operation position has been operated by the player and the operation timing corresponding to the operation instruction marker, wherein the division position determination portion may determine the division position in accordance with evaluation by the operation evaluation portion. Thereby, for example, it is possible to control the game state so that a player who has high game-skills is given an advantageous or a disadvantageous.

The operation input portion may include a plural of operation portions for each player, the lane correlated to each of the plural of operation portions may be displayed in the game image, the operation timings to each of the operation portions may be described in the sequence data, the division position determination portion may determine the division position on each lane, the correlation portion may correlate, for each lane, one area to one of the players and the other area to the other of the players, the area determination portion may determine the size of each area of each lane depending on a corresponding division position, and the marker position determination portion may determine the position on the lane corresponding to each operation portion, with respect to the operation instruction marker of the operation timing corresponding to each operation portion. Thereby, it is possible to provide a high level game, which makes a player operate the operation portion at the operation timing corresponding to the operation portion, each operation portion being correlated to each of the plural lanes. The division positions may be determined at different positions from each other depending on each lane.

Especially, when the game is designed in such a way that each of the plural lanes has the same length and is parallel to a horizontal direction with respect to the game image, and the division position determination portion specifies the division position with respect to the horizontal direction to determine the division position, the division position of each lane is determined to be the same position. Accordingly, it is not necessary for the division position determination portion to determine the division position for each lane.

A second aspect of the present invention provides a computer readable medium storing a computer program to be executed by a computer which comprises: an operation input portion having an operation portion for each of players; a sound output portion outputting reproduced sound; a music data storage portion storing music data for reproducing music; a music reproduction portion reproducing music based on the music data to be output from the sound output portion; a sequence data storage portion storing sequence data where operation timings to operate the operation portion while the music is reproduced are described; and a display portion displaying a game image where a lane having a predetermined length is divided at a division position, the lane extending between operation criterion positions each of which corresponds to each player, wherein the computer program makes the computer function as: a correlation portion correlating one area of the lane divided at the division position to one player, and the other area of the lane divided to the other player; a division position determination portion determining the division position each time when a predetermined condition is satisfied during the game; and a display control portion displaying the game image where, in the area corresponding to each player, the operation instruction marker to direct a corresponding player each of the operation timings is arranged, wherein the display control portion has an area determination portion determining, based on the division position determined by the division position determination portion, a size of the area of the lane corresponding to each player; and a marker position determination portion determining a position of the operation instruction marker corresponding to each of the operation timings by regarding the operation criterion position as a current time, in such a way that a relative positional relation between the operation instruction marker and the operation criterion position changes in accordance with a temporal progress of the music so that the position of the operation instruction marker corresponding to the operation timing described in the sequence data reaches the operation criterion position of the corresponding player at the operation timing taught by the operation instruction marker.

EFFECTS OF THE INVENTION

As mentioned above, according to the present invention, by the division position determination portion, each time when a predetermined condition is satisfied, the division position of the lane to be displayed is determined. By the area determination portion, a size of area corresponding to each player in the lane is determined based on the division position. On the other hand, by the marker position determination portion, the position of the operation instruction marker corresponding to each of the operation timings described in the sequence data is determined in such a way that the position changes in accordance with the progress of music being reproduced. The display control portion makes the display portion display the game image where the operation instruction markers corresponding to each player are arranged in the area corresponding to each player. Thereby, it is possible to provide a game system and the like, in which the areas influence each other, each area where the operation instruction markers of each player are displayed.

DETAILED DESCRIPTION OF THE INVENTION

Figure 1:
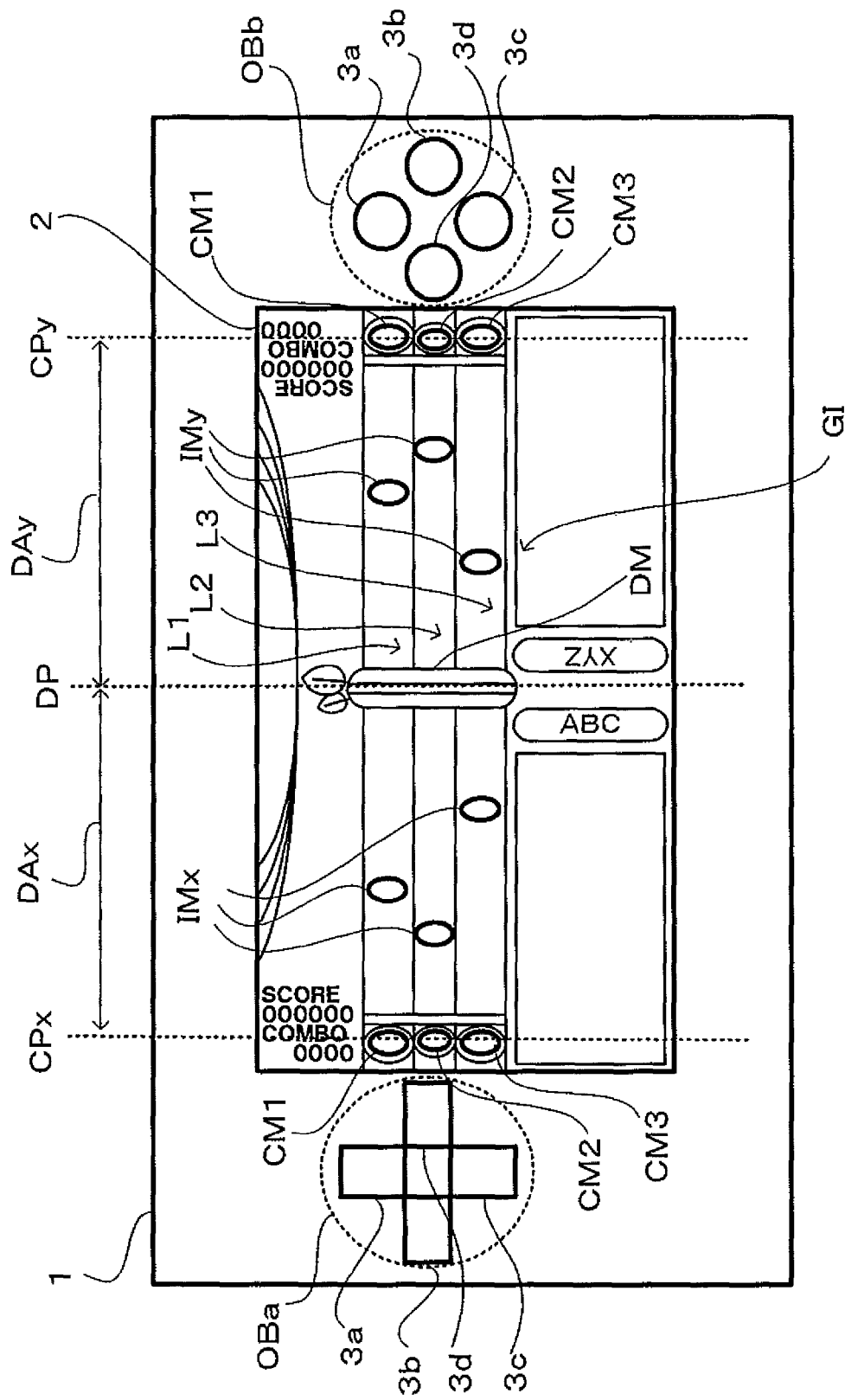
FIG. 1 is a diagram showing an example of a game machine which realizes the game system of the present invention.

First, the outline of the present invention will be described using FIGS. 1 and 2. FIG. 1 shows an outer appearance of a game machine 1 which realizes a game system of the present invention. The game machine 1 of the present invention is a portable game machine. The game machine 1 comprises a monitor 2 where a game image GI is displayed, and operation button groups OBa, OBb each of which exists at each side of the monitor 2. In each operation button group OBa, OBb, four operation buttons 3a, 3b, 3c, 3d are arranged. In this embodiment, the operation button group OBa is correlated to a player PX so that the operation buttons of the operation button group OBa are operated by the player PX, and the operation button group OBb is correlated to a player PY so that the operation buttons of the operation button group OBb are operated by the player PY. Hereinafter, when it is not necessary to identify each of the operation buttons 3a to 3d, each of them is referred to as "the operation button 3". When it is not necessary to identify each of the players PX, PY, each of them is referred to as "the player P".

In the game image GI, three of operation criterion markers CM1 to CM3 which are arranged at an operation criterion position CPx corresponding to the player PX, three of operation criterion markers CM1 to CM3 which are arranged at an operation criterion position CPy corresponding to the player PY, and three of lanes L1 to L3 which are extending between the operation criterion markers CM1 to CM3 of the player PX and the operation criterion markers CM1 to CM3 of the player PY respectively are displayed. Each of the lanes L1 to L3 of the present embodiment is displayed in the shape of a gauge having a predetermined width and a predetermined length. The lanes L1 to L3 are divided into two areas by a division marker DM which is located at a predetermined division position DP.

The range from the division marker DM until the operation criterion position CPx is a display area DAx for the player PX where operation instruction markers IMx are displayed for the player PX. The range from the division marker DM until the operation criterion position CPy is a display area DAy for the player PY where operation instruction markers IMy are displayed for the player PY. In this way, each of lanes L1 to L3 is shared by the players PX, PY, and the display areas DAx, DAy formed by the division position DM are correlated to the players PX, PY respectively.

Hereinafter, when it is not necessary to identify each of the lanes L1 to L3, each of them is referred to as "the lane L". When it is not necessary to identify each of the operation instruction markers IMx, IMy, each of them is referred to as "the operation instruction marker IM". When it is not necessary to identify each of the display areas DAx, DAy, each of them is referred to as "the display area DA". When "the length" is used with respect to the lane L and the display area DA, it indicates a length in the longer direction. The lanes L1, L2, L3 are correlated to the operation buttons 3a, 3b, 3c which are arranged on the extension lines of the lanes L1, L2, L3 respectively. The operation instruction marker IM displayed on the lane L is a marker which directs the player P the operation timing to operate the corresponding operation button 3. For example, as shown in FIG. 1, the operation instruction marker IMx displayed on the lane L1 is a marker which teaches the operation timing to operate the operation button 3a corresponding to the lane L1.

The division position DP moves, as mentioned later, between the operation criterion position CPx of the player PX and the operation criterion position CPy of the player PY in accordance with the score of each player P. In the present invention, the range where the division position DP moves is equal to an entire length of the lane L. The length of lane L corresponds to the time-length of music to be reproduced. The entire length of lane L corresponds to the time-length for four bars of the music to be reproduced. For example, when the division position DP is located at the center of the lane L, the length of the display area DP of each player P is equal to the time-length for two bars.

As the processes for the operation instruction marker IM which is displayed in the display area DA of each player P is similar to each other, the operation instruction marker IMx which is displayed on the lane L1 in the display area DA of the player PX will be described in detail. The operation instruction marker IMx is displayed in such a way: the operation instruction marker IMx comes close to the the operation criterion position CPx gradually in accordance with the progress of music being reproduced, so that the moment when the operation instruction marker IMx reaches the operation criterion position CPx, that is, the operation instruction marker IMx overlaps the the operation criterion marker CM1 is the operation timing of the operation button 3a corresponding to the operation instruction marker IMx. In other wards, the operation instruction marker IMx displayed in the display area DAx is a marker teaching a future operation timing, the display area DAx, which is a range from the operation criterion position CPx as the current time up to the division position DP as a display limit position, is a future time-length which allows the operation instruction marker IMx to be displayed in the game image GI, and the operation timings of the operation button 3a included in the future time-length equal to the display area DAx are displayed as the operation instruction markers IMx.

When the operation button 3a is operated by the player PX, a difference between a moment when the operation button 3a is pushed by the player PX and a moment when the operation instruction marker IMx reaches the operation criterion position CPx (the operation timing to operate the operation button 3a) is determined and the operation of the player PX is evaluated. Additionally, the mentioned processing with respect to the display area DAx of the player PX is executed also for the display area DAy of the player PY at the same time. Therefore, as shown in FIG. 1, when the division position DP exists at the center of lane L, the operation instruction markers IMx, IMy corresponding to each of the display areas DAx, DAy are displayed symmetrically with respect to the division position DP. Then, the operation by the player PY is also evaluated. When the evaluations of players P are obtained, the scores of the players P are updated based on the evaluations relatively. In this embodiment, the division position DP moves in accordance with the scores of players P.

Figure 2:
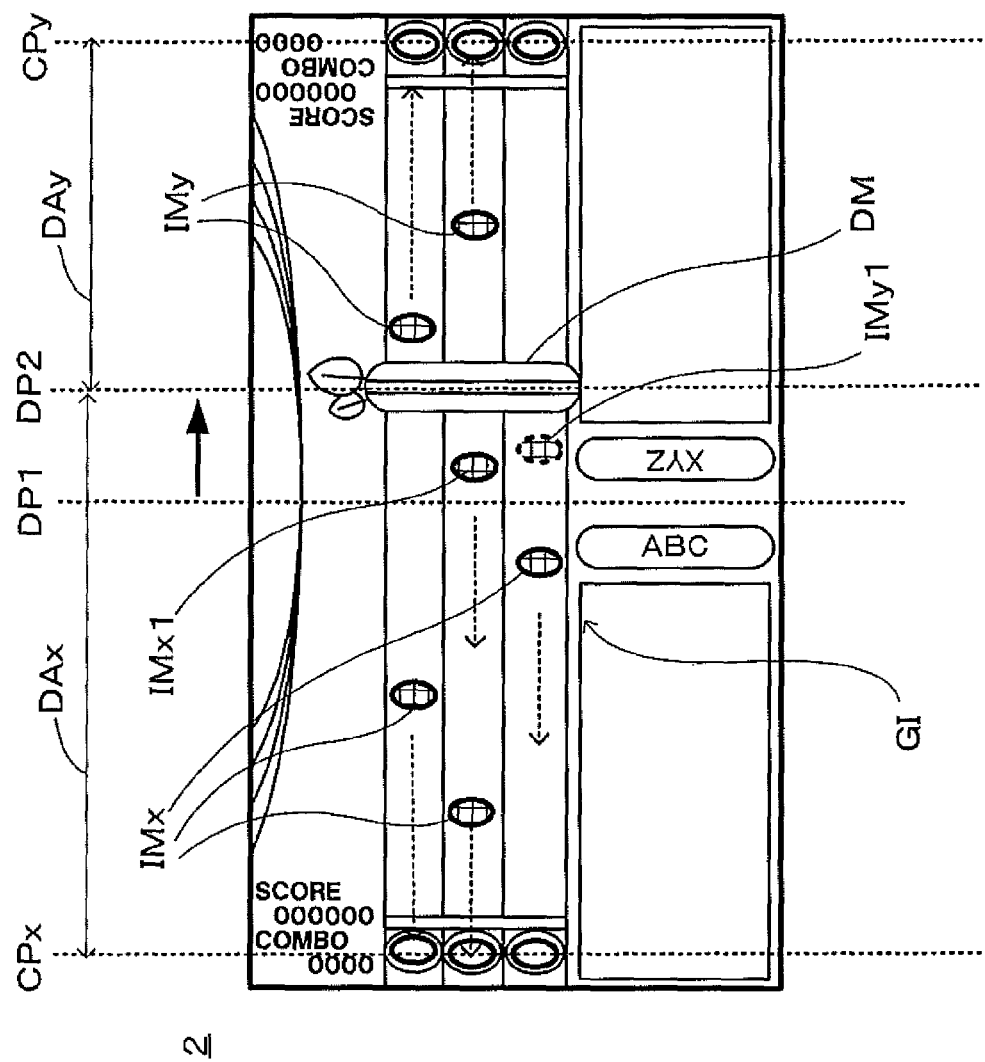
FIG. 2 is a diagram showing a game image displayed in a monitor of the game machine shown in FIG. 1.

For example, as shown in FIG. 2, in a case where the division position DP moves toward the operation criterion position CPy of the player PY to change from the division position DP1 to the division position DP2, the display area DAx for the player PX becomes wider, and the display area DAy for the player PY becomes smaller. In this embodiment, in a case where the score of the player PX is inferior to the score of the player PY, the division position DP moves to the division position DP2. By this movement of the division point DP, as the display area DAx of the player PX becomes wider, it becomes possible to display in the display area DAx, the operation instruction marker IMx1 which was not displayed in the case of the division position DP1. On the other hand, as the display area DAy of the player PY becomes smaller, it becomes impossible to display the operation instruction marker IMy1 which was displayed in the case of the division position DP1.

Thereby, as the player PX inferior to the player PY can recognize the operation timing earlier than the player PY, the operation becomes easier for the player PX. As the player PY superior to the player PX becomes unable to recognize sufficiently the prediction of each operation timing, the operation becomes more difficult for the player PY. On the contrary, in a case where the score of the player PY is inferior to the sore of the player PX, the division position DP is located at the position closer to the operation criterion position CPx of the player PX. Thereby, the display area DAx becomes smaller which leads that the operation of the player PX superior to the player PY becomes more difficult, and the display area DAy becomes wider which means that the operation of the player PY inferior to the player PX becomes easier.

Figure 3:
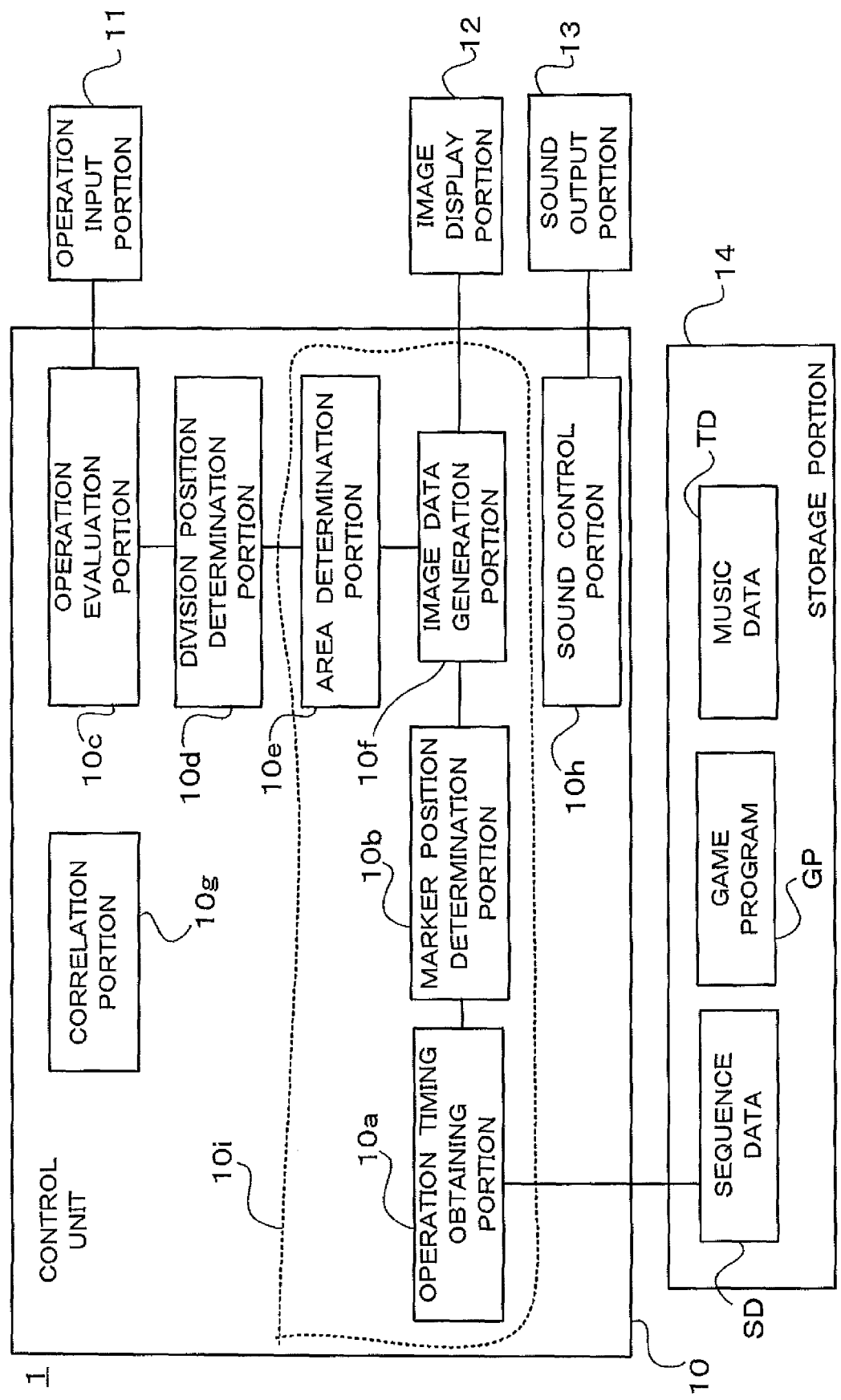
FIG. 3 is a diagram showing a hardware configuration of the game machine shown in FIG. 1.

Hereinafter, concrete configurations and procedures for changing the size of display area DA of each player P as mentioned above will be described. The hardware configuration of the game machine 1 as the game system of the present invention will be described using FIG. 3. The game machine 1 comprises: an operation input portion 11 including the operation buttons 3a to 3d which accept the operation of the player; an image display portion 12 including a monitor 2 which displays the game image GI; a sound output portion 13 including a speaker which outputs reproduced sound of music and various kinds of effect sounds; a storage portion 14 which stores various kinds of data necessary to realize the present invention; and a control unit 10 which controls the operation of the game machine 1.

The main data stored in the storage portion 14 is game program GP, sequence data SD, and music data TD. Thereby, the storage portion 14 functions as a music data storage portion and a sequence data storage portion. The game program GP is a computer program for making the game machine 1 realize the present invention. The music data TD is data for reproducing music. The sequence data will be described using FIG. 4. The sequence data SD has a condition definition portion SDa and an operation sequence portion SDb following the condition definition portion SDa. In the condition definition portion SDa, the information to specify execution conditions of the game and the like which are different for each music is described, the information including the tempo of music (e.g. "BPM") and information for specifying a relation of a degree of difference between an actual operation timing when the player operated actually and the operation timing described in the sequence data SD and an evaluation.

Figure 4:
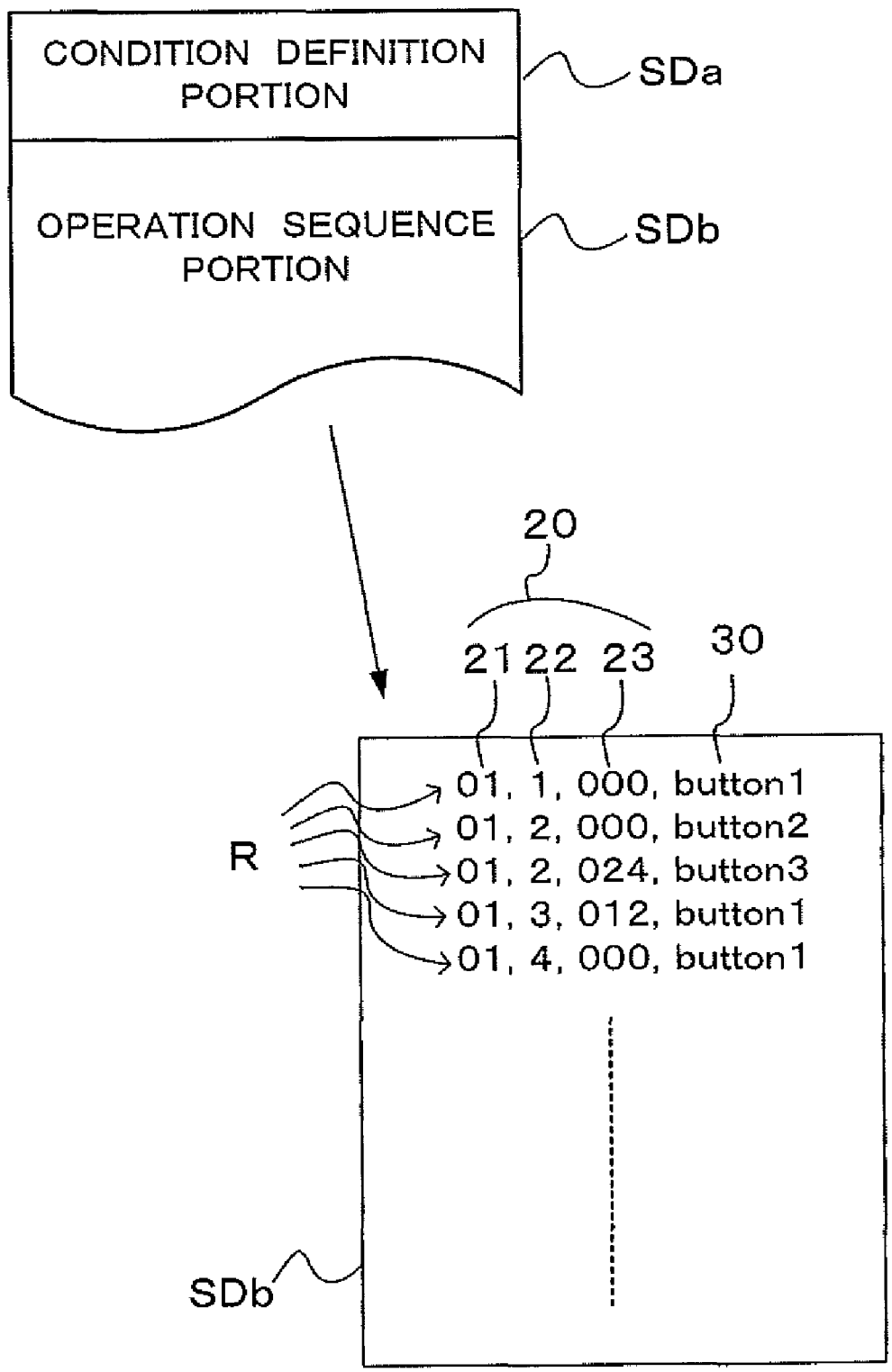
FIG. 4 is a diagram showing an example of data construction of the sequence data.

In the operation sequence portion SDb, the operation timings of the operation buttons 3a to 3c and information specifying one of the operation buttons 3a to 3c to be operated are correlated to be described. The operation sequence portion SDb of the present invention, as shown in FIG. 4, is designed by plural records R, in each of which the operation timing 20 when the operation should be done in the music is correlated to the information 30 specifying the operation button 3 to be operated. The operation timing 20 is described as values represented by the bar number 21 in the music, the number of beats 22, and milli beat 23 which is obtained by dividing one beat into 36 equal pieces, the values being sectioned by commas. For example, the first record R indicates to, at the operation timing corresponding to "1" of bar, "1" of beat, and "000" of milli beat, operate the "button 1", that is, the operation button 3a. The milli beat is not limited to a beat obtained by dividing one beat into 36 equal pieces, and can be set appropriately in the situation.

The control unit 10 has a CPU and various kinds of memory area such as a RAM and a ROM in order to realize operations of CPU. When the game program GP stored in the storage portion 14 is executed, thereby, the control unit 10 functions as an operation timing obtaining portion 10a, a marker position determination portion 10b, an operation evaluation portion 10c, a division position determination portion 10d, an area determination portion 10e, an image data generation portion 10f, a correlation portion 10g and a sound control portion 10h. The operation timing obtaining portion 10a, the marker position determination portion 10b, the area determination portion 10e and the image data generation portion 10f constitute a display control portion 10i. The sound control portion 10h reproduces the sound data TD and outputs reproduced data to the sound output portion 13. The operation evaluation portion 10c evaluates the operation to the button 3 by each player P based on a sensor signal output from the button 3.

The correlation portion 10g correlates the display area DAx to the player PX, the display area DAx being one of the two display areas DA obtained by the division of the division position DP, and the other display area DAy of the two display areas DA to the player PY. The division position determination portion 10d determines the division position DP based on the evaluation of the operation by each player P. The area determination portion 10e determines the display area DA of each player P based on the division position DP. The operation timing obtaining portion 10a obtains a part of records from the sequence data SD. The marker position determination portion 10b determines a position in the game image GI where the operation instruction markers IM should be displayed, each of the operation instruction markers IM corresponding to each of the operation timings 20 described in the records R obtained. The image data generation portion 10f generates and outputs to the image output portion 12, image data so that the operation instruction markers IM, the determined positions of which exist within each display area DAx, DAy, are displayed in each display area DAx, DAy. The details of each of the portions 10a to 10f in the control unit 10 will be described later.

Figure 5:
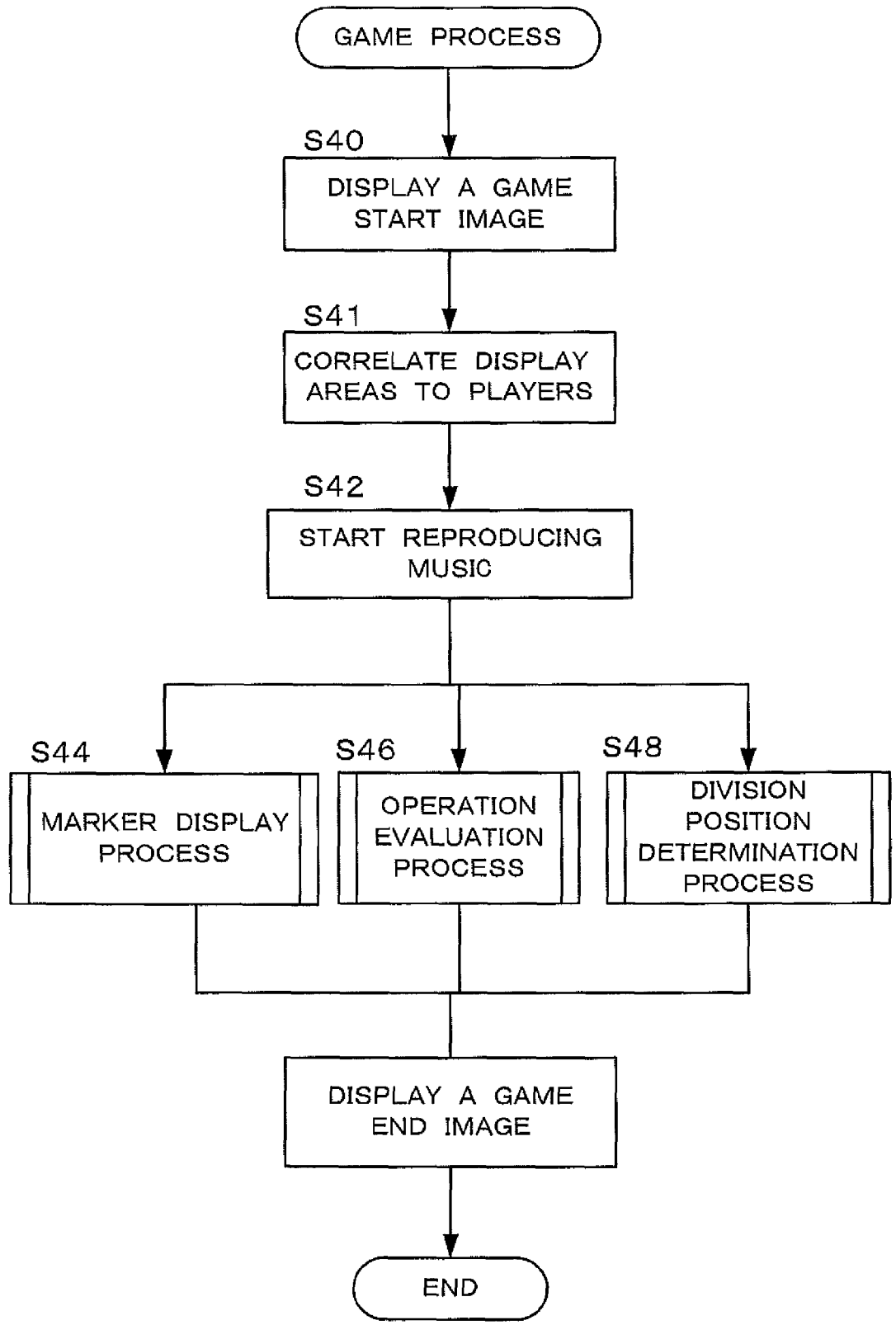
FIG. 5 is a flow chart showing a process flow in a game process.

In the game of the present invention, with the start of the game, the reproduction of music is started based on the music data TD, the operation instruction markers IN are displayed in sequence in the display area DA of each player P by referring the sequence data SD to make the player P operate the operation button 3 at the mentioned operation timing. A game process to be implemented for executing the game will be described using FIG. 5. First, in step S40, a game start image is displayed on the monitor 2. The game start image is the same as the game image GI, and the division marker DM is displayed in such a way that the division marker DM exists at the division position DP that is the center of the lane.

Next, in step S41, the display areas DAx, DAy which are divided into at the division marker DM are correlated to each of the players PX, PY respectively. For example, the operation button groups OBa, OBb operated by the players PX, PY are correlated to the display areas DAx, DAy respectively. Thereby, each of the display areas DAx, DAy, is correlated to each of the players PX, PY. Then, the control unit 10 functions as the correlation portion 10g. Next, in step S42, the reproduction of the music based on the music data is started. With the start of reproduction of music, the time count by a game timer is started. Then, the marker display process in step S44, the operation evaluation process in step S46, and the division position determination process in step S48 are started. The game timer is a timer which counts elapsed time from moment of starting the reproduction of music (1 of bar, 1 of beat and 000 of milli beat). By setting the time-length per one beat, the elapsed time counted by the game timer is recognized as time under the music being reproduced.

The division position determination process is the process where the division position DP is determined in accordance with the evaluation of operation of each player P. The marker display process is the process for displaying on the lane L, the operation instruction marker IM corresponding to each player P. The operation evaluation process is the process where the operation to the operation button 3 by the player P is evaluated and his/her score is updated in accordance with the evaluation. Each process is repeated until the reproduction of music is completed. When the reproduction of music is completed, the game is terminated, and a game end image is displayed in step S48. In the game end image, the play result of each player P and the like are displayed. The details of each of the division position determination process, the marker display process, and the operation evaluation process will be described later.

Figure 6:
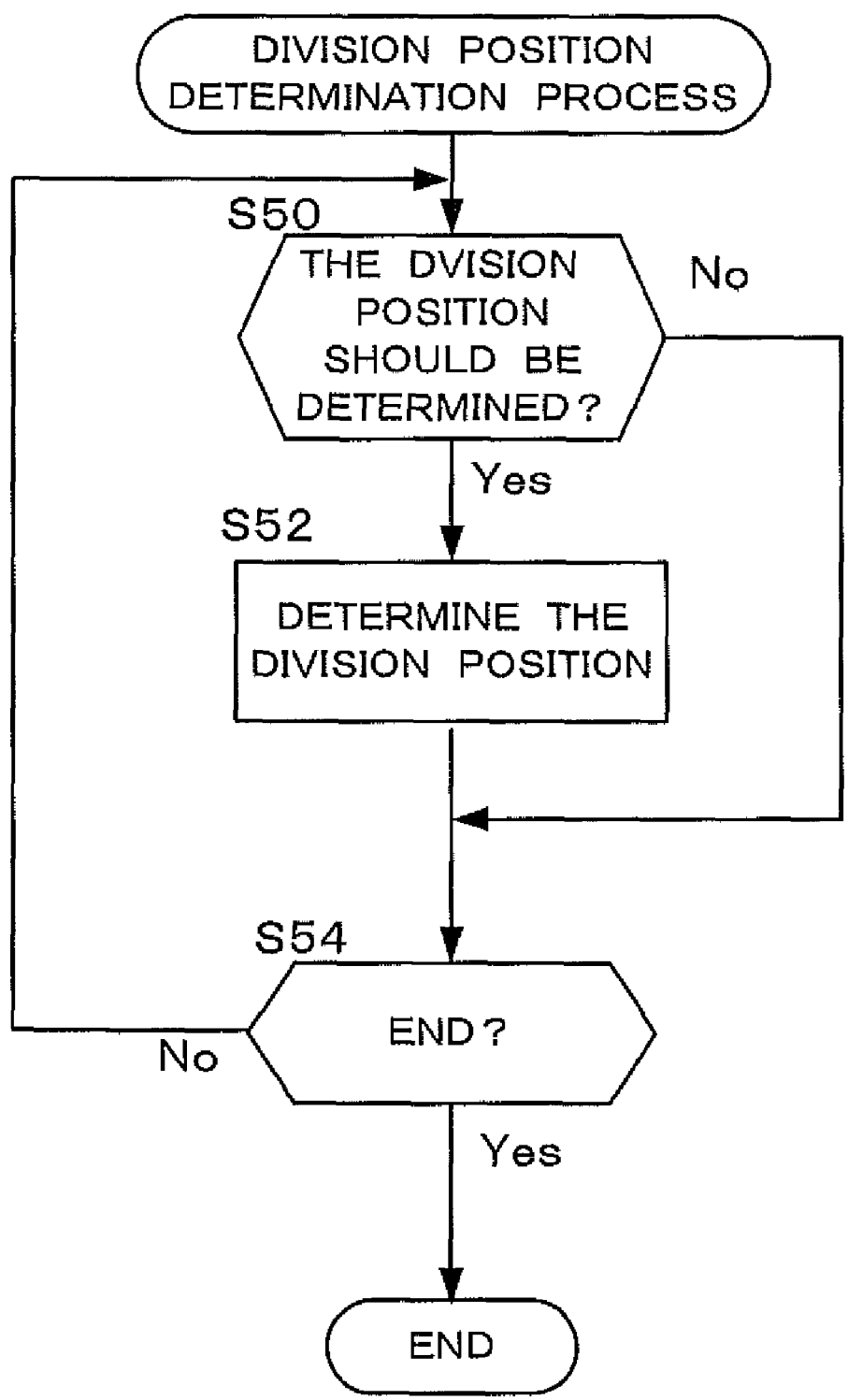
FIG. 6 is a flow chart showing a process flow in a division position determination process.

The division position determination process will be described by following a flow chart shown in FIG. 6. The division position determination process is controlled by the control unit 10. Thereby, the control unit 10 function as the division position determination portion 10d. First, in step S50, it is determined whether or not the division position DP should be determined. In this embodiment, at the moment of updating the score of the player P, an affirmative determination is determined. When the affirmative determination is determined, the process goes to step S52 where the process for determining the division position DP is executed. The division position DP is determined so that a relative rate between the score of the player PX and the score of the player PY coincides with a relative rate between the size of the display area DAy for the player PY and the size of the display area DAx for the player PX. For example, when the score of the player PX is 100 and the score of the player PY is 75, the division position DP is determined at the position indicating a relative rate between the size of the display area DAx and the size of the display area DAy is 3:4.

After the processing in step S52, the process goes to step S54. In a case of a negative determination in step S50, the processing of step S52 is skipped and the process goes to step S54. In step S54, it is determined whether the division position determination process should be terminated or not. For example, in a case that an end time of the game has been determined in advance, when the game timer indicates the end time, it is determined that the process should be terminated. In step S54, in a case of a negative determination in step S54, the process returns to step S50 to repeat the division position determination process, and in a case of an affirmative determination, the division position determination process is terminated. In this way, each time a trigger condition is satisfied in step S50, the division position DP is determined until the division position determination process is terminated.

Figure 7:
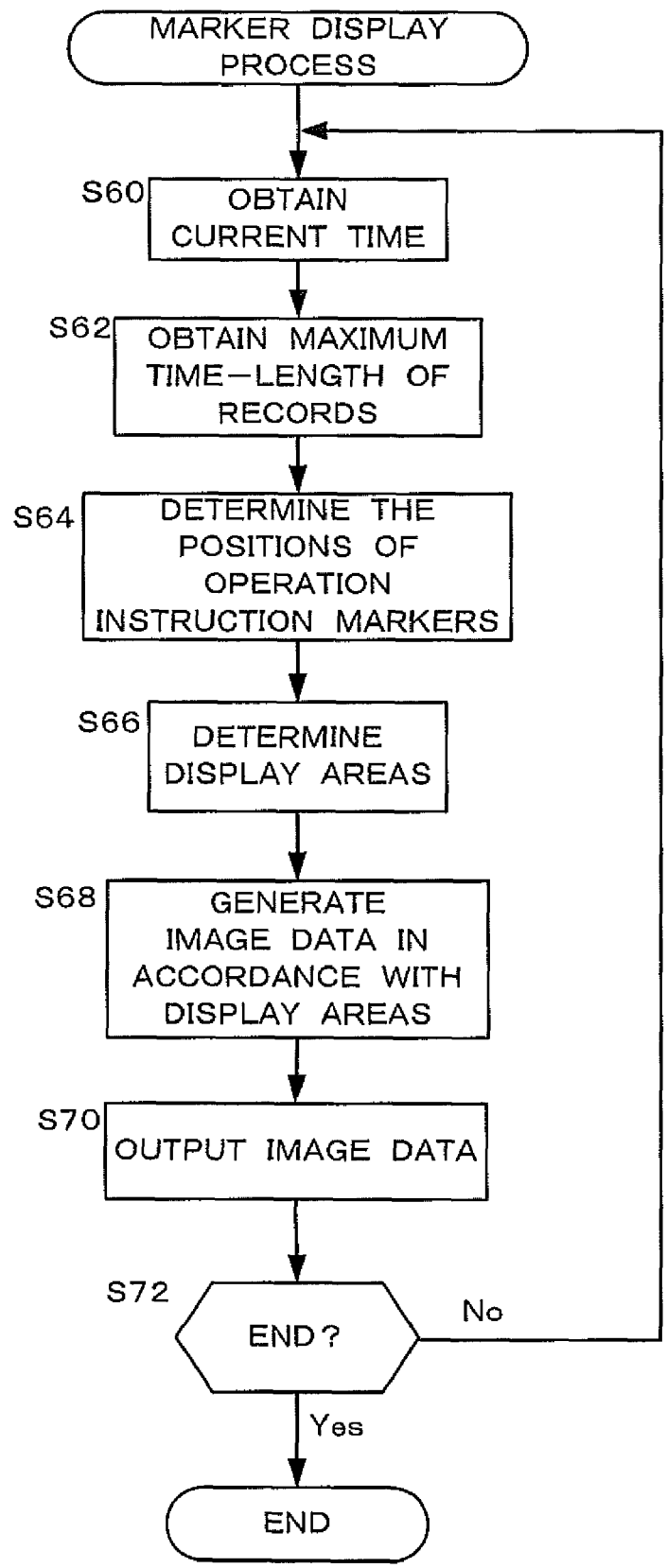
FIG. 7 is a flow chart showing a process flow in a marker display process.

The marker display process will be described by following a flowchart shown in FIG. 7. The marker display process is controlled by the control unit 10. Thereby, the control unit 10 functions as the display control portion 10i. As the processing in step S60 to step S66 are implemented at the same time with respect to the players PX, PY, only a case of the player PX will be described. First, in step S60, the game timer is referred and the current time in the music being reproduced is obtained. Next, in step S62, records R of the maximum time-length is obtained. The maximum time-length is the maximum time-length of the display area DAx, which corresponds to four bars in the present embodiment. Accordingly, The records R corresponding to four bars from the current time are obtained from the sequence data SD. Thereby, the control unit 10 functions as the operation timing obtaining portion 10*a*.

Subsequently, in step S64, the position on the lane L corresponding to the operation timing of each record R obtained is determined as the position where the operation instruction marker IM should be displayed. Thereby, the control unit 10 functions as the marker position determination portion 10*b*. The position of the operation instruction marker IM is determined so that the length from the criterion position CPx to the position of the operation instruction marker IM corresponds to the time-length from the current time to the operation timing. For example, when the entire length of the lane L corresponds to four bars, it is possible to determine in advance the length of lane L corresponding to the time-length for milli beat unit. By determining the position of the operation instruction marker IM in this way, the closer the operation timing comes to the current time, the nearer the operation instruction marker IMx is displayed to the operation criterion marker CPx corresponding to the current time. Thereby, it is possible to realize a relative change between the operation criterion position CPx and the position of the operation instruction marker IMx with the progress of music being reproduced.

When, with respect to the obtained records R, the positions of the operation instruction markers IMx of all operation timings 20 are determined, the process goes to step S66 to determine the display area DAx. Thereby, the control unit 10 functions as the area determination portion 10*e*. The display area DAx is determined as a range from the operation criterion position CPx of the player PX to the division position DP determined by the division position determination process. In subsequent step S68, the image data is generated appropriately for the display areas DAx, DAy determined in step S68. Thereby, the control unit 10 functions as the image data generation portion 10*f*. Concretely speaking, the image data is generated for the game image GI, where, of the positions of the operation instruction markers IMx determined in step S64, only the operation instruction markers IM, the positions of which are included in the display area DAx determined in step S66, are arranged on the corresponding lane L, the operation instruction markers IMy are arranged on the corresponding lane L in the similar way, and the division marker DM is located at the division position DP determined.

Then, in step S70, the image data generated is displayed through the image display portion 12. Subsequently, in step S72, it is determined whether the marker display process is terminated or not. For example, when the game timer indicates a predetermined end time, it is determined the process is terminated. When a negative determination is determined in step S72, the process returns to step S60 to repeat the marker display process, and an affirmative determination is determined, the marker display process is terminated.

Figure 8:
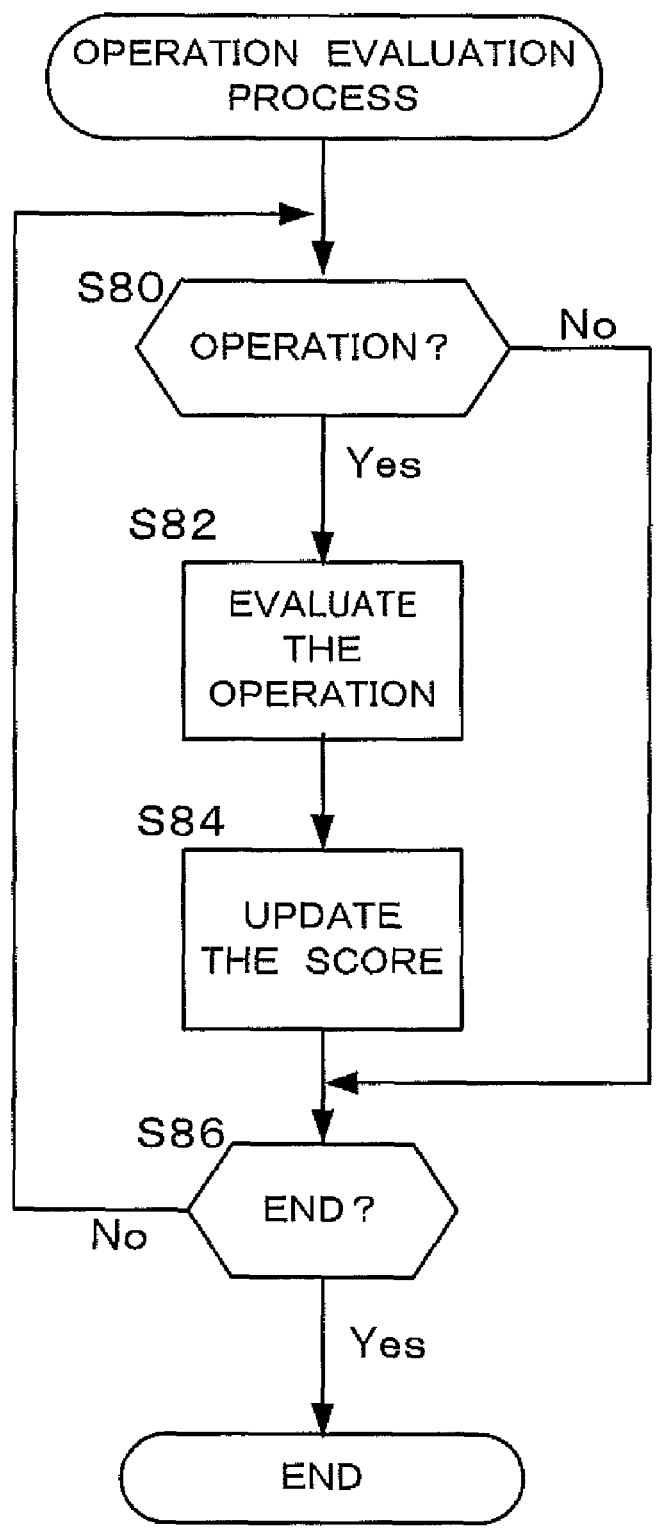
FIG. 8 is a flow chart showing a process flow in an operation evaluation process.

The operation evaluation process will be described by following a flowchart shown in FIG. 8. The operation evaluation process is controlled by the control unit 10. Thereby, the control unit 10 functions as the operation evaluation portion 10*c*. First, in step S80, it is determined whether the operation button 3 has been operated or not. When a negative determination is determined in step S80, the process goes to step S86, and when an affirmative determination is determined, the process goes to step S82. In step S82, the operation performed by the player P is evaluated. The evaluation is determined in accordance with an amount of difference between the operation timing actually performed and the operation timing described in the sequence data SD for the operation button 3, which is actually performed.

For example, the processing can be implemented in such a way that a table to be referred is prepared, the table where a stepwise evaluation is correlated to the amount of difference so that, when the amount of difference is smaller than a predetermined value, the evaluation is determined as the highest evaluation, and when the amount of difference is bigger than a predetermined value, the evaluation is determined as the lowest evaluation. It does not matter whether a common table to all operation portions 3 is prepared, or common tables different from each other depending on the operation portion 3 are prepared. When the evaluation of the operation is determined, the process goes to step S84 to update the score of the player P corresponding to the operation portion 3 performed based on the evaluation determined. After the update of the score, the process goes to step S86 to be determined whether the operation evaluation process is terminated or not. For example, the game timer indicates the end time of the music, it is determined that the process is terminated. When a negative determination is determined in step S86, the process returns to step S80 to repeat the operation evaluation process. When an affirmative determination is determined, the operation evaluation process is terminated.

The present invention is not limited to the aforementioned embodiment, but can be executed through various embodiments. For example, the present invention can be executed in such a way that music data TD corresponding to plural pieces of music is stored in the storage portion 14, music can be selected at the moment of starting the game. In this case, the sequence data SD for each music is also prepared, and the sequence data SD corresponding to the selected music is used in the game. The movement range where the division position DP can move could be shorter than the entire length of the lane L as long as the center of the range is the center of the lane L. In this case, at the moment of determining the division portion DP, the aforementioned process can be executed by regarding the entire length L of the lane as the movement range.

In addition, the operation instruction marker IM to be displayed to each player can be displayed, not symmetrically with respect to the division position DP of the lane L, in such a way that the same arrangement is provided to each player P. In this case, the operation portion 3 corresponding to each lane L is provided at the same position for each player P. For example, in FIG. 1, the operation instruction marker IMx to be displayed on the lane L1 of the player Px and the operation instruction marker IMy to be displayed on the lane L3 can be displayed symmetrically with respect to the division position DP. The division position DP can be determined based on the score of each player at every predetermined time, or can be determined based on the other elements without relation to the evaluation. Alternatively, in a case that the division position DP is determined each time the operation is evaluated, the correlation between the evaluation of each player P and the the division position DP can be determined in such a way that the display area DA of an inferior player P gets smaller and the display area DA of a superior player P gets bigger.

Figure 9:
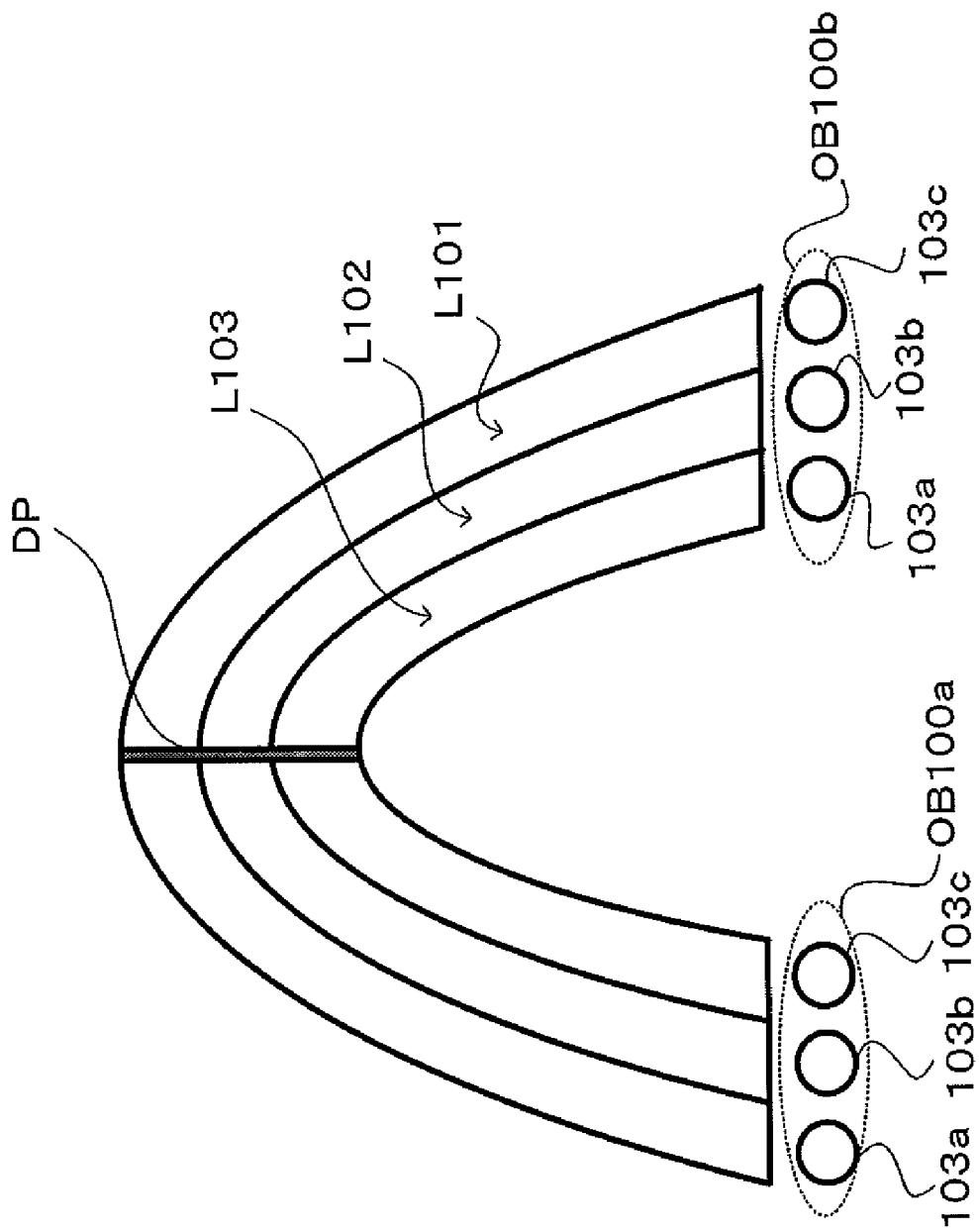
FIG. 9 is a diagram showing another embodiment with respect to the arrangement of the operation input portion of each player in the game machine.
Figure 10:
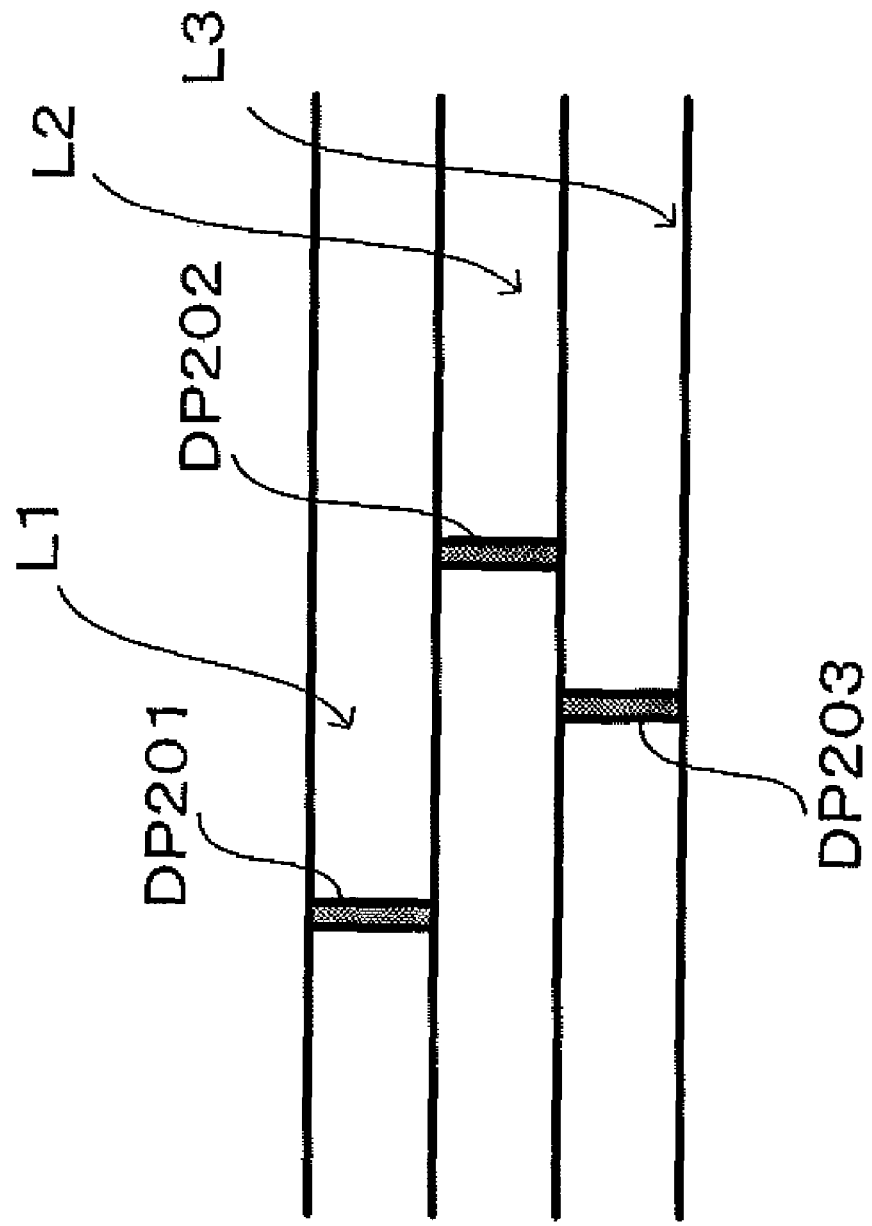
FIG. 10 is a diagram showing another embodiment with respect to the division position.

It is enough to locate the operation portion 3 of each player P on a line extended in the direction where the corresponding lane L extends. For example, as shown in FIG. 9, the operation button groups OB100*a*, OB100*b* can be provided so that the players P to battle with each other comes abreast of each other. In this case, the lanes L103, L102, L101 corresponding to the operation buttons 103*a*, 103*b*, 103*c* can draw arches as shown in FIG. 9 respectively. In addition, as shown in FIG.

10, to the lanes L1, L2, L3, the division positions DP201, DP202, DP203 which moves independently of each other can be set respectively. In this case, the evaluation of each player P is determined for each lane L, and in reply to the evaluation of each lane L, the division position DP of the corresponding lane L can be determined based on the aforementioned way.

In the aforementioned embodiment, the records R of the maximum time-length are obtained from the sequence data SD, and after that, from the records R obtained, the operation instruction markers IM teaching the operation timings corresponding to the display area DA are displayed in the game image GI. However, the present invention can be executed in such a way that the records R corresponding to the display area DA are obtained, and the operation instruction markers IM of all operation timings described in the records R obtained are displayed in the game image GI. This case will be explained as the second embodiment only about different parts from the aforementioned embodiment.

Figure 11:
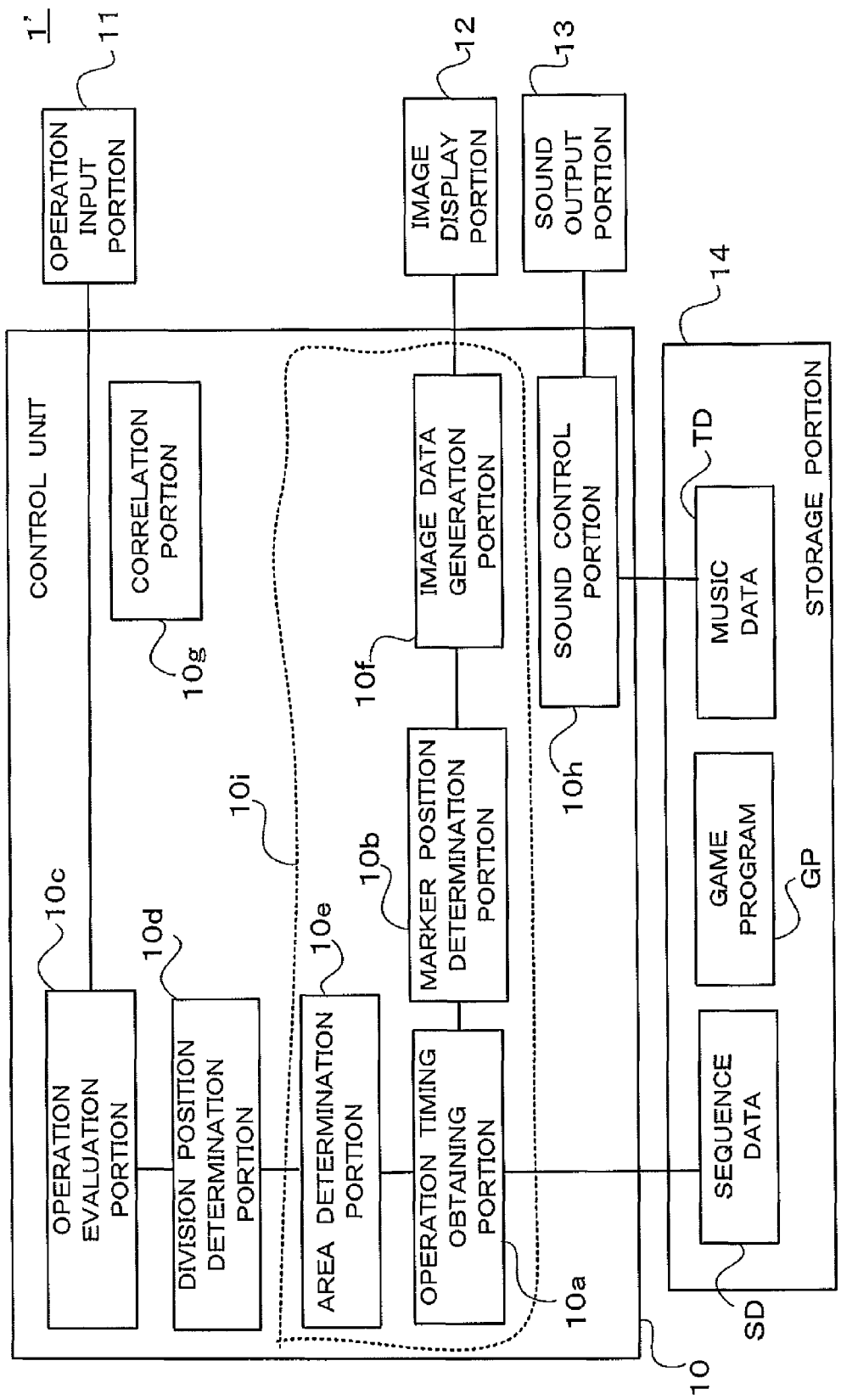
FIG. 11 is a diagram showing a hardware configuration of the game machine in the second embodiment.

The hardware configuration of the game machine 1' in the second embodiment is shown in FIG. 11. The operation timing obtaining portion 10a obtains records R from the sequence data SD based on the display area DA of each player P which has been determined by the area determination portion 10e. The marker position determination portion 10b determined the position of the operation instruction marker IM in the game image GI, the operation instruction marker IM corresponding to each of the operation timings described in the records R obtained. In the image data generation portion 10f, the image data is generated so that each of the operation instruction markers IM is displayed at the position determined by the marker position determination portion 10b.

Figure 12:
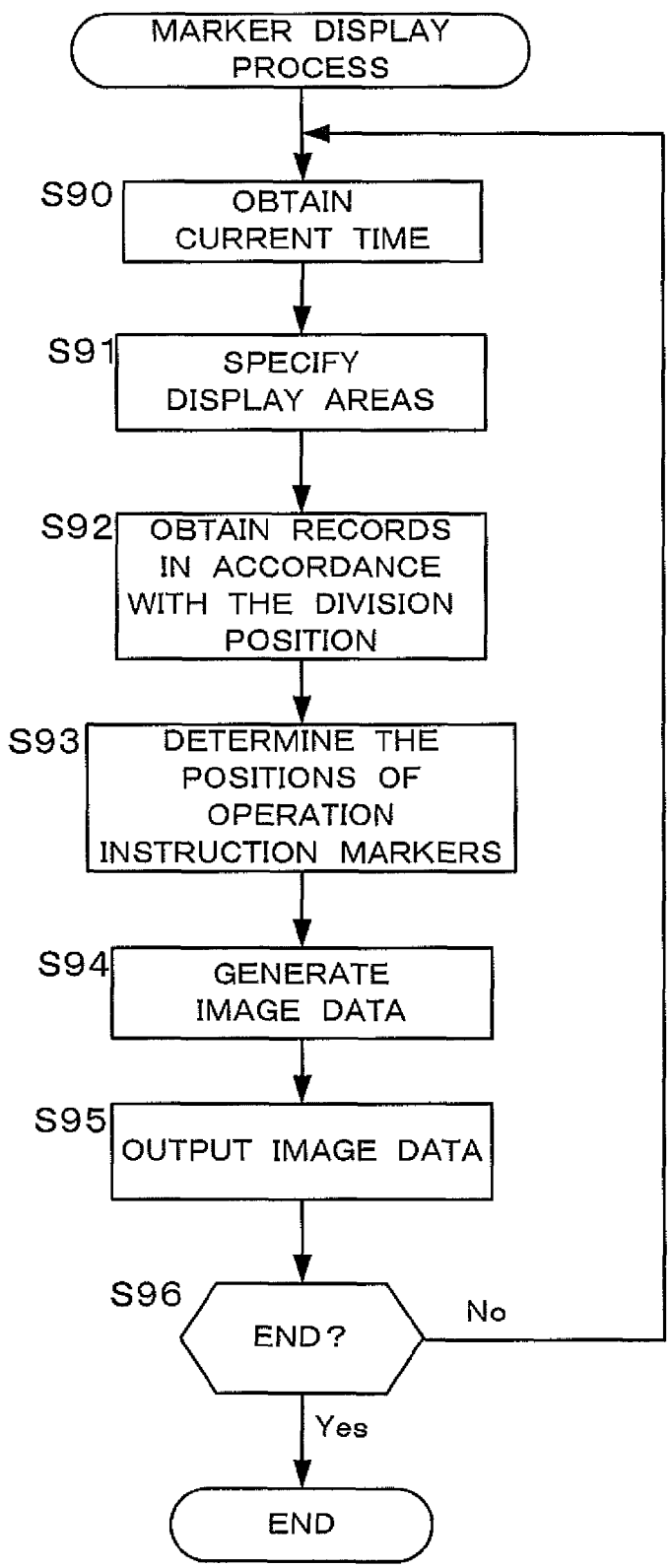
FIG. 12 is a flow chart showing a process flow of the marker display process in the second embodiment.

The marker display process in the second embodiment will be described focusing on the operation instruction marker IMx to be displayed in the display area DAx of the player PX, by following a flow chart shown in FIG. 12. As the processes from step S90 to step S93 are executed at the same time to each player P, only the processes for the player PX will be described. First, in step S90, the game timer is referred and the current time in the music being reproduced is obtained. Subsequently, in step S91, the display area DAx is determined. Thereby, the control unit 10 functions as the area determination portion 10e. The display area DAx is determined as a range from the operation criterion position CP to the division position DP determined by the division position determination process. Next, the process goes to step S92 to obtain the records R in accordance with a range of the display area DAx determined in step S91. It is enough to obtain the records R set included in the time-length corresponding to the length of the display area DAx from the current time. Thereby, the control unit 10 functions as the operation timing obtaining portion 10a.

The length of the lane L corresponding to the time-length can be set as the aforementioned embodiment. Subsequently, in step S93, the position of the operation instruction markers IM are determined, the operation instruction markers IM teaching the operation timings 20 described in the records R obtained respectively. Thereby, the control unit 10 functions as the marker position determination portion 10b. The position of the operation instruction marker IM is determined so that the length from the operation criterion position CPx to the position of the operation instruction marker IMx corresponds to the time-length from the current time to the operation timing. Thereby, it is possible to realize, with the progress of music being reproduced, a relative change between the operation criterion position CPx and the position of the operation instruction marker IMx.

With respect to the records R obtained, when the positions of the operation instruction markers IMx corresponding to all operation timings 20 are determined, the process goes to step S94 to generate the image data of the game image GI where each operation instruction marker IMx, IMy is arranged, and the division marker DM is located at the division position DP determined. Thereby, the control unit 10 functions as the image data generation portion 10f. Subsequently, in step S95, the image data generated is output to the image display portion 12. Then, in step S96, it is determined whether the marker display process is terminated or not. For example, when the game timer indicates a predetermined end time, it is determined that the process is terminated. When a negative determination is determined in step S96, the process returns to step S90 to repeat the marker display process. When an affirmative determination is determined, the marker display process is terminated.

The embodiment of the game machine where the game system of the present invention is realized is enough to realize the present invention. For example, the game machine for home use (including portable type and stationary type) could be applied to the present invention or the game machine for business (an arcade game machine) also could be applied. Additionally, with respect to the positional relation between the operation portion 3 and the lane L, when a correlation between each operation portion 3 and each lane L is stable, a case where the operation portion 3 is not located on a line extended from the lane L could be applied to the present invention. For example, in a case where the game image is displayed so that the longer direction of the lane L shown in FIG. 1 coincides with the horizontal direction to each player P, the operation portions 3 to be operated by each player P could be provided in front of each player P. In this case, each player P operates the operation portions 3 existing at hand, with watching the area corresponding to himself/herself in the game image.

The invention claimed is:

1. A game system comprising:
    an operation input portion having an operation portion for each of players;
    a sound output portion outputting reproduced sound;
    a music data storage portion storing music data for reproducing music;
    a music reproduction portion reproducing music based on the music data to be output from the sound output portion;
    a sequence data storage portion storing sequence data where operation timings to operate the operation portion while the music is reproduced are described;
    a display portion displaying a game image where a lane having a predetermined length is divided at a division position, the lane extending between operation criterion positions each of which corresponds to each player;
    a correlation portion correlating one area of the lane divided at the division position to one player, and the other area of the lane divided to the other player;
    a division position determination portion determining the division position each time when a predetermined condition is satisfied during the game; and
    a display control portion displaying the game image where, in the area corresponding to each player, the operation instruction marker to direct a corresponding player each of the operation timings is arranged, wherein
    the display control portion has
    an area determination portion determining, based on the division position determined by the division position determination portion, a size of the area of the lane corresponding to each player; and a marker position determination portion determining a position of the operation instruction marker corresponding to each of the operation timings by regarding the operation criterion position as a current time, in such a way that a relative positional relation between the operation instruction marker and the operation criterion position changes in accordance with a temporal progress of the music so that the position of the operation instruction marker corresponding to the operation timing described in the sequence data reaches the operation criterion position of the corresponding player at the operation timing taught by the operation instruction marker.

2. The game system of claim 1, wherein
the display control portion further comprises
an operation timing obtaining portion obtaining from the sequence data, the operation timings which are included from the current time on the music up to a maximum time-length in which the operation instruction marker can be displayed, and
the marker position determination portion determines the position of the operation instruction markers corresponding to the operation timings obtained by the operation timing obtaining portion, and selects, within the operation instruction markers the positions of which have been determined, the operation instruction markers existing in the area of the player corresponding to the operation instruction markers to arrange the operation instruction markers in the area.

3. The game system of claim 1, wherein
the display control portion further comprises
an operation timing obtaining portion, for each player, specifying time-length corresponding to the area and obtaining from the sequence data, the operation timings included from a current time on the music up to the time-length specified, and
the marker position determination portion determines a position of the operation instruction marker corresponding to each of the operation timings obtained by the operation timing obtaining portion, and arranges on the lane, the operation instruction markers the positions of which have been determined.

4. The game system of claim 1, wherein
the display control portion displays also a division position marker teaching the division position, while displaying the operation instruction markers of each player.

5. The game system of claim 1, wherein
both end sides of the lane are provided, in the game image, so that each of the end sides extends toward the operation criterion position corresponding to each player, and
the operation portion corresponding to each player is provided on a line extended in a direction where the end side extends toward the operation criterion position of the corresponding player.

6. The game system of claim 1, wherein an operation criterion marker is located at the operation criterion position corresponding to each player in the game image, the operation criterion marker having the same shape as the operation instruction marker, and
the marker position determination portion determines a position of the operation instruction marker so that the operation instruction marker coincides with the operation criterion marker located at the operation criterion position of the corresponding player at the operation timing taught by the operation instruction marker.

7. The game system of claim 1, further comprising an operation evaluation portion evaluating an operation by the player based on a moment when the operation position has been operated by the player and the operation timing corresponding to the operation instruction marker, wherein
the division position determination portion determines the division position in accordance with evaluation by the operation evaluation portion.

8. The game system of claim 1, wherein
the operation input portion includes a plural of operation portions for each player,
the lane correlated to each of the plural of operation portions is displayed in the game image,
the operation timings to each of the operation portions are described in the sequence data,
the division position determination portion determines the division position on each lane,
the correlation portion correlates, for each lane, one area to one of the players and the other area to the other of the players,
the area determination portion determines the size of each area of each lane depending on a corresponding division position, and
the marker position determination portion determines the position on the lane corresponding to each operation portion, with respect to the operation instruction marker of the operation timing corresponding to each operation portion.

9. A computer readable medium storing a computer program to be executed by a computer which comprises:
an operation input portion having an operation portion for each of players;
a sound output portion outputting reproduced sound; a music data storage portion storing music data for reproducing music;
a music reproduction portion reproducing music based on the music data to be output from the sound output portion;
a sequence data storage portion storing sequence data where operation timings to operate the operation portion while the music is reproduced are described; and
a display portion displaying a game image where a lane having a predetermined length is divided at a division position, the lane extending between operation criterion positions each of which corresponds to each player, wherein
the computer program makes the computer function as:
a correlation portion correlating one area of the lane divided at the division position to one player, and the other area of the lane divided to the other player;
a division position determination portion determining the division position each time when a predetermined condition is satisfied during the game; and
a display control portion displaying the game image where, in the area corresponding to each player, the operation instruction marker to direct a corresponding player each of the operation timings is arranged, wherein
the display control portion has
an area determination portion determining, based on the division position determined by the division position determination portion, a size of the area of the lane corresponding to each player; and
a marker position determination portion determining a position of the operation instruction marker corresponding to each of the operation timings by regarding the operation criterion position as a current time, in such a way that a relative positional relation between the operation instruction marker and the operation criterion position changes in accordance with a temporal progress of the music so that the position of the operation instruction marker corresponding to the operation timing described in the sequence data reaches the operation criterion position of the corresponding player at the operation timing taught by the operation instruction marker.

10. The game system of claim 2, wherein
the display control portion displays also a division position marker teaching the division position, while displaying the operation instruction markers of each player.

11. The game system of claim 3, wherein
the display control portion displays also a division position marker teaching the division position, while displaying the operation instruction markers of each player.

12. The game system of claim 2, wherein
both end sides of the lane are provided, in the game image, so that each of the end sides extends toward the operation criterion position corresponding to each player, and
the operation portion corresponding to each player is provided on an line extended in a direction where the end side extends toward the operation criterion position of the corresponding player.

13. The game system of claim 3, wherein
both end sides of the lane are provided, in the game image, so that each of the end sides extends toward the operation criterion position corresponding to each player, and
the operation portion corresponding to each player is provided on an line extended in a direction where the end side extends toward the operation criterion position of the corresponding player.

14. The game system of claim 2, wherein an operation criterion marker is located at the operation criterion position corresponding to each player in the game image, the operation criterion marker having the same shape as the operation instruction marker, and
the marker position determination portion determines a position of the operation instruction marker so that the operation instruction marker coincides with the operation criterion marker located at the operation criterion position of the corresponding player at the operation timing taught by the operation instruction marker.

15. The game system of claim 3, wherein an operation criterion marker is located at the operation criterion position corresponding to each player in the game image, the operation criterion marker having the same shape as the operation instruction marker, and
the marker position determination portion determines a position of the operation instruction marker so that the operation instruction marker coincides with the operation criterion marker located at the operation criterion position of the corresponding player at the operation timing taught by the operation instruction marker.

16. The game system of claim 2, further comprising an operation evaluation portion evaluating an operation by the player based on a moment when the operation position has been operated by the player and the operation timing corresponding to the operation instruction marker, wherein
the division position determination portion determines the division position in accordance with evaluation by the operation evaluation portion.

17. The game system of claim 3, further comprising an operation evaluation portion evaluating an operation by the player based on a moment when the operation position has been operated by the player and the operation timing corresponding to the operation instruction marker, wherein
the division position determination portion determines the division position in accordance with evaluation by the operation evaluation portion.

* * * * *